US012596255B2

(12) United States Patent
Lowney

(10) Patent No.: US 12,596,255 B2
(45) Date of Patent: Apr. 7, 2026

(54) POLARIZATION MECHANISM TO REDUCE WAVEGUIDE REFLECTIONS IN A HEAD-WORN DISPLAY

(71) Applicant: GOOGLE LLC, Mountain View, CA (US)

(72) Inventor: Joseph Daniel Lowney, Tucson, AZ (US)

(73) Assignee: GOOGLE LLC, Mountain View, CA (US)

( * ) Notice: Subject to any disclaimer, the term of this patent is extended or adjusted under 35 U.S.C. 154(b) by 363 days.

(21) Appl. No.: 18/136,794

(22) Filed: Apr. 19, 2023

(65) Prior Publication Data

US 2023/0375834 A1     Nov. 23, 2023

Related U.S. Application Data

(60) Provisional application No. 63/332,829, filed on Apr. 20, 2022.

(51) Int. Cl.
G02B 27/01        (2006.01)
G02B 27/28        (2006.01)

(52) U.S. Cl.
CPC ....... G02B 27/0172 (2013.01); G02B 27/281 (2013.01); *G02B 2027/0178* (2013.01)

(58) Field of Classification Search
None
See application file for complete search history.

(56) References Cited

U.S. PATENT DOCUMENTS

| | | | |
|---|---|---|---|
| 8,797,468 B2 | 8/2014 | Saitoh et al. | |
| 9,983,413 B1 * | 5/2018 | Sahlsten | G06T 11/60 |
| 10,234,686 B2 * | 3/2019 | Vallius | G02B 6/0026 |
| 2017/0176745 A1 * | 6/2017 | Poon | G02B 27/283 |
| 2019/0369390 A1 | 12/2019 | Gollier | |
| 2021/0157043 A1 | 5/2021 | Beon et al. | |
| 2025/0155612 A1 | 5/2025 | Danziger et al. | |

FOREIGN PATENT DOCUMENTS

| | | |
|---|---|---|
| CN | 111103696 A | 5/2020 |
| CN | 111458879 A | 7/2020 |
| CN | 113687512 A | 11/2021 |
| CN | 216083281 U | 3/2022 |

* cited by examiner

*Primary Examiner* — Nicholas J Lee

(57)                ABSTRACT

A polarization mechanism for a head-mounted device includes a linear polarization film and a waveplate film configured to polarize ambient light before it is guided to the eye of a user by a waveguide. The waveplate film is further configured to receive a reflection of the polarized ambient light off the waveguide and polarize the reflection in a circular direction such that the reflection is polarized in a first linear direction. The linear polarization film then receives the reflection polarized in the first linear direction from the waveplate film and polarizes the reflection in a second linear direction perpendicular to the first linear direction.

20 Claims, 9 Drawing Sheets

POLARIZATION MECHANISM TO REDUCE WAVEGUIDE REFLECTIONS IN A HEAD-WORN DISPLAY

CROSS-REFERENCE TO RELATED APPLICATIONS

The present application claims priority to U.S. Provisional Patent Application Ser. No. 63/332,829, entitled "POLAR-IZATION MECHANISM TO REDUCE WAVEGUIDE REFLECTIONS IN A HEAD-MOUNTED DISPLAY" and filed on Apr. 20, 2022, the entirety of which is incorporated by reference herein.

BACKGROUND

Within some head-mounted displays, waveguides are used to guide light from an optical engine to the eye of a user in order to display one or more images to the user. To this end, these waveguides commonly are formed from materials that are at least partially reflective such as high-index glass or high-index optical plastics. Additionally, such wave-guides typically have a planar shape that includes two opposing flat surfaces. Due to the materials and the planar shape of these waveguides, ambient light (e.g., sunlight, indoor lighting, outdoor lighting) from outside the HWD commonly reflects off the surfaces of the waveguides either toward the user or toward those around the user, creating a jarring experience for both the user and those around them and negatively impacting the user experience.

BRIEF DESCRIPTION OF THE DRAWINGS

The present disclosure may be better understood, and its numerous features and advantages are made apparent to those skilled in the art by referencing the accompanying drawings. The use of the same reference symbols in different drawings indicates similar or identical items.

DETAILED DESCRIPTION

Figure 1:
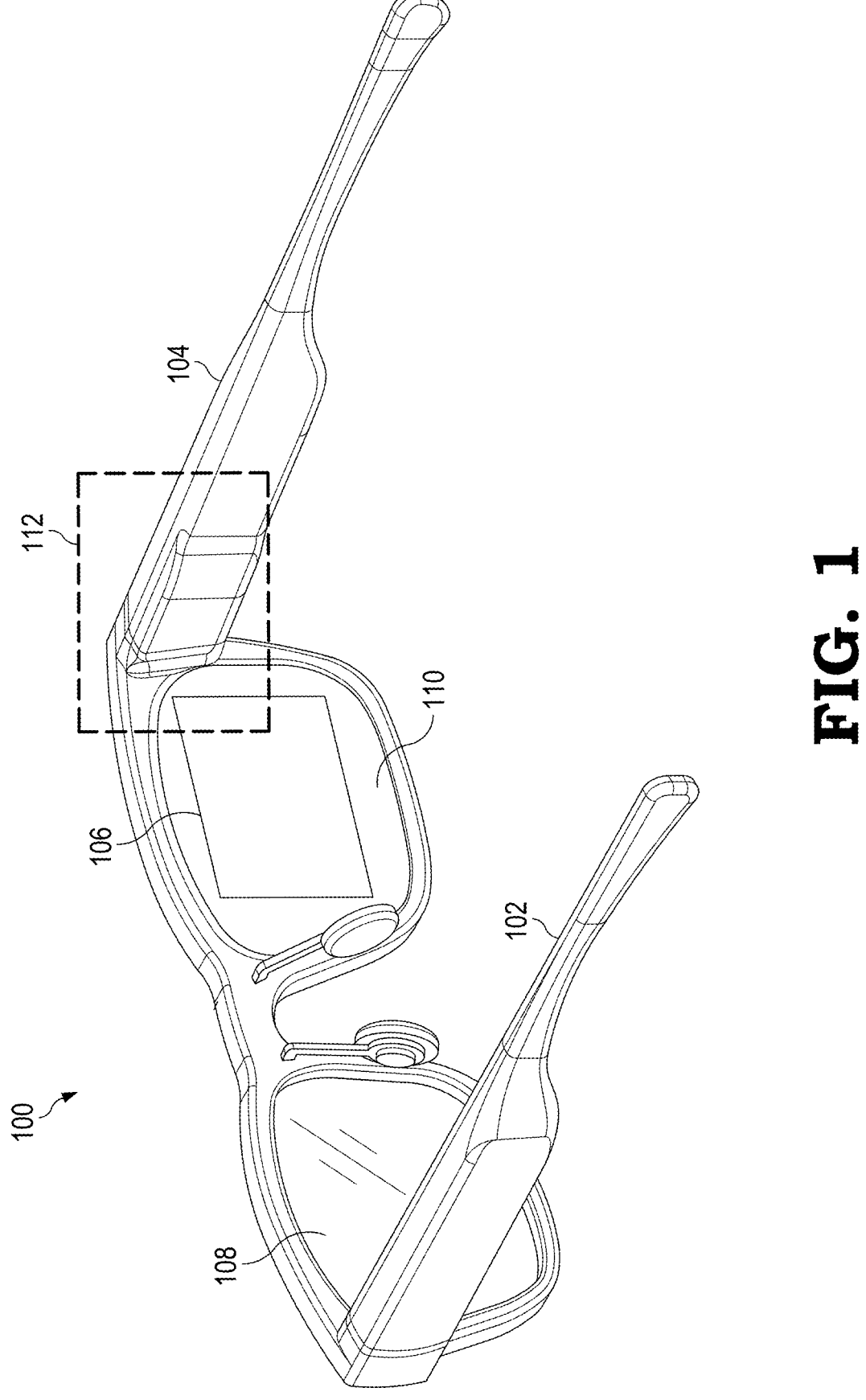
FIG. 1 is a diagram of an example display system housing a laser projector system configured to project images toward the eye of a user, in accordance with some embodiments.

Some head-worn displays (HWDs) (e.g., augmented real-ity head-worn devices) are designed to look like eyeglasses, with at least one of the lenses containing a waveguide to direct light to a user's eye. The combination of the lens and waveguide is referred to as an "optical combiner," "optical combiner lens," or both. Such waveguides form, for example, exit pupil expanders (EPEs) and outcouplers that form and guide light to the user's eye. For example, a waveguide forms an outcoupler configured to direct received light toward the eye of a user. The HWDs generally have a frame designed to be worn in front of a user's eyes to allow the user to view both their environment and computer-generated content projected from the combiner. Components that are necessary to the functioning of a typical HWDs, such as, for example, an optical engine to project computer-generated content (e.g., light representative of one or more images), cameras to pinpoint physical location, cameras to track the movement of the user's eye(s), processors to power the optical engine, and a power supply, are typically housed within the frame of the HWD. As an HWD frame has limited volume in which to accommodate these components, it is desirable that these components be as small as possible and configured to interact with the other components in very small volumes of space.

Further, some HWDs include waveguides having a sur-face that is at least partially reflective. For example, some waveguides include surfaces formed from plastic molded parts, plastic-formed parts, plastic embossed parts, glass, high-index glass, or the like that are at least partially reflective. Because the surfaces of some waveguides are at least partially reflective, ambient light (e.g., sunlight, indoor lighting, outdoor lighting) from outside an HWD commonly reflects off a surface of a waveguide in a direction away from the user and towards those around the user, creating a jarring experience for those around the user. Additionally, ambient light from outside the HWD commonly reflects off a surface of a waveguide toward the eye of the user, creating a similarly jarring experience for the user and negatively affecting the user experience.

To help minimize such reflections, some systems and techniques disclosed herein are directed to a polarization mechanism implemented in an optical combiner of an HWD that has an eye-facing side (e.g., a side of the optical combiner facing the user) and a world-facing side (e.g., a side of the optical combiner facing away from the user). Such a polarization mechanism includes an optical combiner having a waveguide, a quarter waveplate (e.g., quarter waveplate film), and a linear polarizer (e.g., a linear polar-ization film). Within the optical combiner, for example, the linear polarizer is disposed at a world-facing side of the optical combiner, the waveguide is disposed at an eye-facing side of the optical combiner, and the quarter waveplate is disposed between the linear polarizer and the waveguide. To help reduce reflections in the HWD from ambient light, the linear polarizer of the optical combiner is configured to receive ambient light from outside the HWD (e.g., ambient light received at the world-facing side of the optical com-biner) and polarize the ambient light in a first linear direc-tion. The linear polarizer is then configured to provide the linearly polarized ambient light (e.g., ambient light polar-ized in a first linear direction) to the quarter waveplate which is configured to polarize the linearly polarized ambient light in a circular direction and provide the circularly polarized light to the waveguide. When portions of the circularly polarized ambient light are reflected off a surface of the waveguide in a direction away from the user (e.g., toward the world-facing side of the optical combiner), the reflected portions pass through the quarter waveplate and are again circularly polarized. Because the ambient light was previously circularly polarized before it reflected off the waveguide, circularly polarizing the reflected light results in the reflected light being linearly polarized in a second linear direction perpendicular to the first linear direction. The linearly polarized reflected light is then received at the linear polarization film where it is absorbed (e.g., it does not pass through the linear polarization film). In this way, reflections off the waveguide towards those around the user are reduced, improving the user experience.

Additionally, some systems and techniques discussed herein are directed to a symmetric polarization mechanism implemented in the optical combiner of the HWD. The symmetric polarization mechanism includes the optical combiner further having a second linear polarizer (e.g., linear polarization film) and a second quarter waveplate (e.g., quarter waveplate film). The second linear polarizer is disposed at the eye-facing side of the optical combiner and the second quarter waveplate is disposed between the second linear polarizer and the waveguide. To reduce reflections of ambient light that are directed toward the user, the second linear polarizer is configured to receive ambient light from outside the HWD (e.g., ambient light received at the eye-facing side of the optical combiner) and polarize the ambient light in a first linear direction. The second linear polarizer is then configured to provide the linearly polarized ambient light (e.g., ambient light polarized in a first linear direction) to the second quarter waveplate which is configured to polarize the linearly polarized ambient light in a circular direction and provide the circularly polarized light to the waveguide. When portions of the circularly polarized ambient light are reflected off a surface of the waveguide in a direction toward the user (e.g., toward the eye-facing side of the optical combiner), the reflected portions pass through the quarter waveplate and are again circularly polarized such that the reflected portions are polarized in a second linear direction perpendicular to the first linear direction. The linearly polarized reflected portions (e.g., the reflected portion linearly polarized in the second linear direction) are then received at the second linear polarization film where they are absorbed (e.g., the portions do not pass through the second linear polarization film). In this way, reflections off the waveguide towards the user are reduced, improving the user experience.

FIG. 1 illustrates an example display system 100 having a support structure 102 that includes an arm 104, which houses a laser projection system configured to project images toward the eye of a user, such that the user perceives the projected images as being displayed in a field of view (FOV) area 106 of a display at one or both of lens elements 108, 110. In the depicted embodiment, the display system 100 is an eyewear display that includes a support structure 102 configured to be worn on the head of a user and has a general shape and appearance of an eyeglasses (e.g., sunglasses) frame. The support structure 102 contains or otherwise includes various components to facilitate the projection of such images toward the eye of the user, such as a laser projector, an optical scanner, and a waveguide. In some embodiments, the support structure 102 further includes various sensors, such as one or more front-facing cameras, rear-facing cameras, other light sensors, motion sensors, accelerometers, and the like. The support structure 102 further can include one or more radio frequency (RF) interfaces or other wireless interfaces, such as a Bluetooth™ interface, a Wi-Fi interface, and the like. Further, in some embodiments, the support structure 102 further includes one or more batteries or other portable power sources for supplying power to the electrical components of the display system 100. In some embodiments, some or all of these components of the display system 100 are fully or partially contained within an inner volume of support structure 102, such as within the arm 104 in region 112 of the support structure 102. It should be noted that while an example form factor is depicted, it will be appreciated that in other embodiments the display system 100 may have a different shape and appearance from the eyeglasses frame depicted in FIG. 1.

One or both of the lens elements 108, 110 are used by the display system 100 to provide an augmented reality (AR) display in which rendered graphical content can be superimposed over or otherwise provided in conjunction with a real-world view as perceived by the user through the lens elements 108, 110. For example, laser light used to form a perceptible image or series of images may be projected by a laser projector of the display system 100 onto the eye of the user via a series of optical elements, such as a waveguide formed at least partially in the corresponding lens element, one or more scan mirrors, and one or more optical relays. One or both of the lens elements 108, 110 thus include at least a portion of a waveguide that routes display light received by an incoupler of the waveguide to an outcoupler of the waveguide, which outputs the display light toward an eye of a user of the display system 100. The display light is modulated and scanned onto the eye of the user such that the user perceives the display light as an image. In addition, each of the lens elements 108, 110 is sufficiently transparent to allow a user to see through the lens elements to provide a field of view of the user's real-world environment such that the image appears superimposed over at least a portion of the real-world environment.

In some embodiments, the projector is a digital light processing-based projector, a scanning laser projector, or any combination of a modulative light source such as a laser or one or more LEDs and a dynamic reflector mechanism such as one or more dynamic scanners or digital light processors. In some embodiments, the projector includes multiple laser diodes (e.g., a red laser diode, a green laser diode, and/or a blue laser diode) and at least one scan mirror (e.g., two one-dimensional scan mirrors, which may be micro-electromechanical system (MEMS)-based or piezo-based). The projector is communicatively coupled to the controller and a non-transitory processor-readable storage medium or memory storing processor-executable instructions and other data that, when executed by the controller, cause the controller to control the operation of the projector. In some embodiments, the controller controls a scan area size and scan area location for the projector and is communicatively coupled to a processor (not shown) that generates content to be displayed at the display system 100. The projector scans light over a variable area, designated the FOV area 106, of the display system 100. The scan area size corresponds to the size of the FOV area 106 and the scan area location corresponds to a region of one of the lens elements 108, 110 at which the FOV area 106 is visible to the user. Generally, it is desirable for a display to have a wide FOV to accommodate the outcoupling of light across a wide range of angles. Herein, the range of different user eye positions that will be able to see the display is referred to as the eyebox of the display.

In some embodiments, the projector routes light via first and second scan mirrors, an optical relay disposed between the first and second scan mirrors, and a waveguide disposed at the output of the second scan mirror. In some embodiments, at least a portion of an outcoupler of the waveguide may overlap the FOV area 106. These aspects are described in greater detail below.

Figure 2:
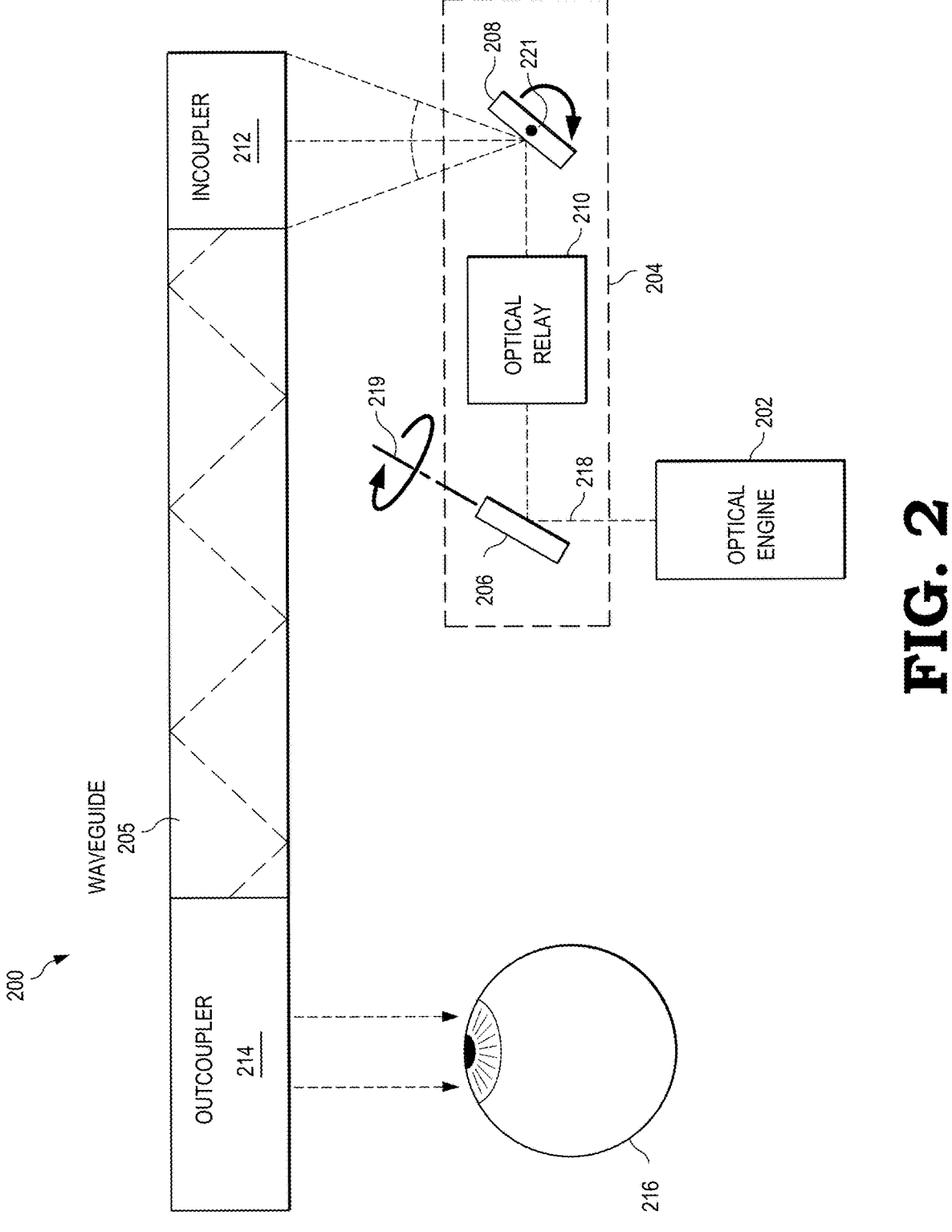
FIG. 2 is a diagram illustrating a laser projection system that projects images directly onto the eye of a user via laser light, in accordance with some embodiments.

FIG. 2 illustrates a simplified block diagram of a laser projection system 200 that projects images directly onto the eye of a user via laser light. The laser projection system 200 includes an optical engine 202, an optical scanner 204, and a waveguide 205. The optical scanner 204 includes a first scan mirror 206, a second scan mirror 208, and an optical relay 210. The waveguide 205 includes an incoupler 212 and an outcoupler 214, with the outcoupler 214 being optically aligned with an eye 216 of a user in the present example. In some embodiments, the laser projection system 200 is implemented in a wearable heads-up display or other display system, such as the display system 100 of FIG. 1.

The optical engine 202 includes one or more laser light sources configured to generate and output laser light 218 (e.g., visible laser light such as red, blue, and green laser light and/or non-visible laser light such as infrared laser light). In some embodiments, the optical engine 202 is coupled to a driver or other controller (not shown), which controls the timing of emission of laser light from the laser light sources of the optical engine 202 in accordance with instructions received by the controller or driver from a computer processor coupled thereto to modulate the laser light 218 to be perceived as images when output to the retina of an eye 216 of a user.

For example, during the operation of the laser projection system 200, multiple laser light beams having respectively different wavelengths are output by the laser light sources of the optical engine 202, then combined via a beam combiner (not shown), before being directed to the eye 216 of the user. The optical engine 202 modulates the respective intensities of the laser light beams so that the combined laser light reflects a series of pixels of an image, with the particular intensity of each laser light beam at any given point in time contributing to the amount of corresponding color content and brightness in the pixel being represented by the combined laser light at that time.

One or both of the scan mirrors 206 and 208 of the optical scanner 204 are MEMS mirrors in some embodiments. For example, the scan mirror 206 and the scan mirror 208 are MEMS mirrors that are driven by respective actuation voltages to oscillate during active operation of the laser projection system 200, causing the scan mirrors 206 and 208 to scan the laser light 218. Oscillation of the scan mirror 206 causes laser light 218 output by the optical engine 202 to be scanned through the optical relay 210 and across a surface of the second scan mirror 208. The second scan mirror 208 scans the laser light 218 received from the scan mirror 206 toward an incoupler 212 of the waveguide 205. In some embodiments, the scan mirror 206 oscillates along a first scanning axis 219, such that the laser light 218 is scanned in only one dimension (i.e., in a line) across the surface of the second scan mirror 208. In some embodiments, the scan mirror 208 oscillates or otherwise rotates along a second scanning axis 221. In some embodiments, the first scanning axis 219 is perpendicular to the second scanning axis 221.

In some embodiments, the incoupler 212 has a substantially rectangular profile and is configured to receive the laser light 218 and direct the laser light 218 into the waveguide 205. The incoupler 212 is defined by a smaller dimension (i.e., width) and a larger orthogonal dimension (i.e., length). In an embodiment, the optical relay 210 is a line-scan optical relay that receives the laser light 218 scanned in a first dimension by the first scan mirror 206 (e.g., the first dimension corresponding to the small dimension of the incoupler 212), routes the laser light 218 to the second scan mirror 208, and introduces a convergence to the laser light 218 in the first dimension to an exit pupil beyond the second scan mirror 208. Herein, an "exit pupil" in an optical system refers to the location along the optical path where beams of light intersect. For example, the possible optical paths of the laser light 218, following reflection by the first scan mirror 206, are initially spread along the first scanning axis, but later these paths intersect at an exit pupil beyond the second scan mirror 208 due to convergence introduced by the optical relay 210. For example, the width (i.e., smallest dimension) of a given exit pupil approximately corresponds to the diameter of the laser light corresponding to that exit pupil. Accordingly, the exit pupil can be considered a "virtual aperture". According to various embodiments, the optical relay 210 includes one or more collimation lenses that shape and focus the laser light 218 on the second scan mirror 208 or includes a molded reflective relay that includes two or more spherical, aspheric, parabolic, and/or freeform lenses that shape and direct the laser light 218 onto the second scan mirror 208. The second scan mirror 208 receives the laser light 218 and scans the laser light 218 in a second dimension, the second dimension corresponding to the long dimension of the incoupler 212 of the waveguide 205. In some embodiments, the second scan mirror 208 causes the exit pupil of the laser light 218 to be swept along a line along the second dimension. In some embodiments, the incoupler 212 is positioned at or near the swept line downstream from the second scan mirror 208 such that the second scan mirror 208 scans the laser light 218 as a line or row over the incoupler 212.

In some embodiments, the optical engine 202 includes an edge-emitting laser (EEL) that emits a laser light 218 having a substantially elliptical, non-circular cross-section, and the optical relay 210 magnifies or minimizes the laser light 218 along its semi-major or semi-minor axis to circularize the laser light 218 prior to convergence of the laser light 218 on the second scan mirror 208. In some such embodiments, a surface of a mirror plate of the scan mirror 206 is elliptical and non-circular (e.g., similar in shape and size to the cross-sectional area of the laser light 218). In other such embodiments, the surface of the mirror plate of the scan mirror 206 is circular.

The waveguide 205 of the laser projection system 200 includes the incoupler 212 and the outcoupler 214. The term "waveguide," as used herein, will be understood to mean a combiner using one or more of total internal reflection (TIR), specialized filters, and/or reflective surfaces, to transfer light from an incoupler (such as the incoupler 212) to an outcoupler (such as the outcoupler 214). In some display applications, the light is a collimated image, and the waveguide transfers and replicates the collimated image to the eye. In general, the terms "incoupler" and "outcoupler" will be understood to refer to any type of optical grating structure, including, but not limited to, diffraction gratings, holograms, holographic optical elements (e.g., optical elements using one or more holograms), volume diffraction gratings, volume holograms, surface relief diffraction gratings, and/or surface relief holograms. In some embodiments, a given incoupler or outcoupler is configured as a transmissive grating (e.g., a transmissive diffraction grating or a transmissive holographic grating) that causes the incoupler or outcoupler to transmit light and to apply designed optical function(s) to the light during the transmission. In some embodiments, a given incoupler or outcoupler is a reflective grating (e.g., a reflective diffraction grating or a reflective holographic grating) that causes the incoupler or outcoupler to reflect light and to apply designed optical function(s) to the light during the reflection. In the present example, the laser light 218 received at the incoupler 212 is relayed to the outcoupler 214 via the waveguide 205 using TIR. The laser light 218 is then output to the eye 216 of a user via the outcoupler 214. As described above, in some embodiments the waveguide 205 is implemented as part of an eyeglass lens, such as the lens 108 or lens 110 (FIG. 1) of the display system having an eyeglass form factor and employing the laser projection system 200.

Although not shown in the example of FIG. 2, in some embodiments additional optical components are included in any of the optical paths between the optical engine 202 and the scan mirror 206, between the scan mirror 206 and the optical relay 210, between the optical relay 210 and the scan mirror 208, between the scan mirror 208 and the incoupler 212, between the incoupler 212 and the outcoupler 214, and/or between the outcoupler 214 and the eye 216 (e.g., in order to shape the laser light for viewing by the eye 216 of the user). In some embodiments, a prism is used to steer light from the scan mirror 208 into the incoupler 212 so that light is coupled into incoupler 212 at the appropriate angle to encourage propagation of the light in waveguide 205 by TIR. Also, in some embodiments, an exit pupil expander (e.g., an exit pupil expander 304 of FIG. 3, described below), such as a fold grating, is arranged in an intermediate stage between incoupler 212 and outcoupler 214 to receive light that is coupled into waveguide 205 by the incoupler 212, expand the light, and redirect the light towards the outcoupler 214, where the outcoupler 214 then couples the laser light out of waveguide 205 (e.g., toward the eye 216 of the user).

Figure 3:
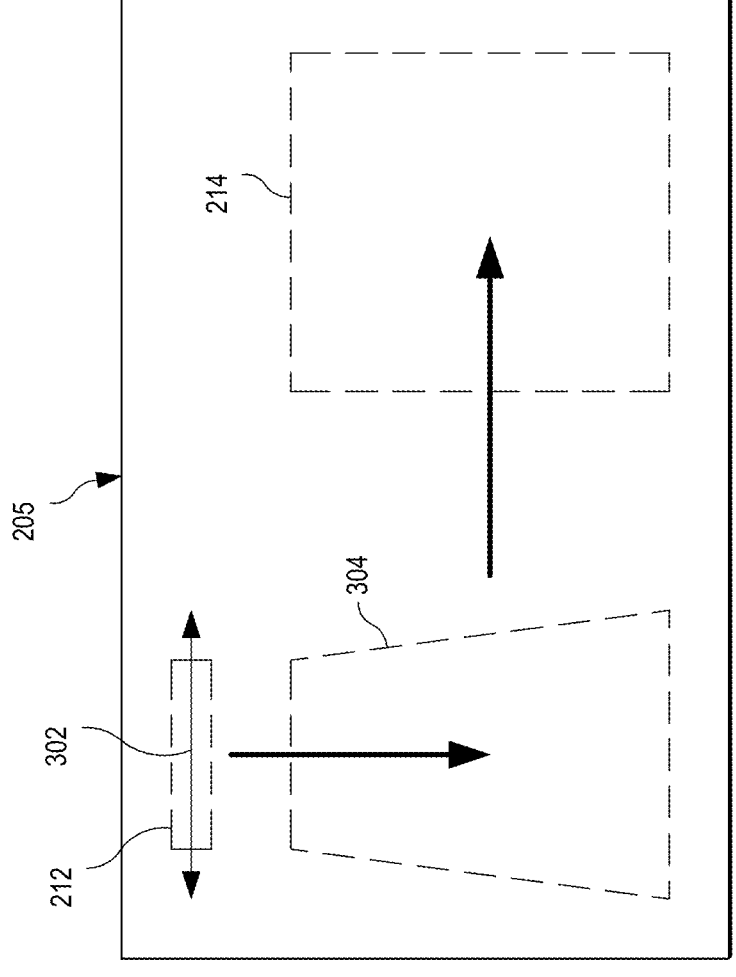
FIG. 3 is a diagram illustrating an example waveguide exit pupil expansion system, in accordance with some embodi-ments.

FIG. 3 shows an example of light propagation within the waveguide 205 of the laser projection system 200 of FIG. 2 in accordance with some embodiments. As shown, light received via the incoupler 212, which is scanned along the scanning axis 302, is directed into an exit pupil expander (EPE) 304 and is then routed to the outcoupler 214 to be output (e.g., toward the eye of the user). In some embodiments, the exit pupil expander 304 expands one or more dimensions of the eyebox of a WHUD that includes the laser projection system 200 (e.g., with respect to what the dimensions of the eyebox of the WHUD would be without the exit pupil expander 304). In some embodiments, the incoupler 212 and the exit pupil expander 304 each include respective one-dimensional diffraction gratings (i.e., diffraction gratings that extend along one dimension). It should be understood that FIG. 3 shows a substantially ideal case in which the incoupler 212 directs light straight down (with respect to the presently illustrated view) in a first direction that is perpendicular to the scanning axis 302, and the exit pupil expander 304 directs light to the right (with respect to the presently illustrated view) in a second direction that is perpendicular to the first direction. While not shown in the present example, it should be understood that, in some embodiments, the first direction in which the incoupler 212 directs light is slightly or substantially diagonal, rather than exactly perpendicular, with respect to the scanning axis 302.

Figure 4:
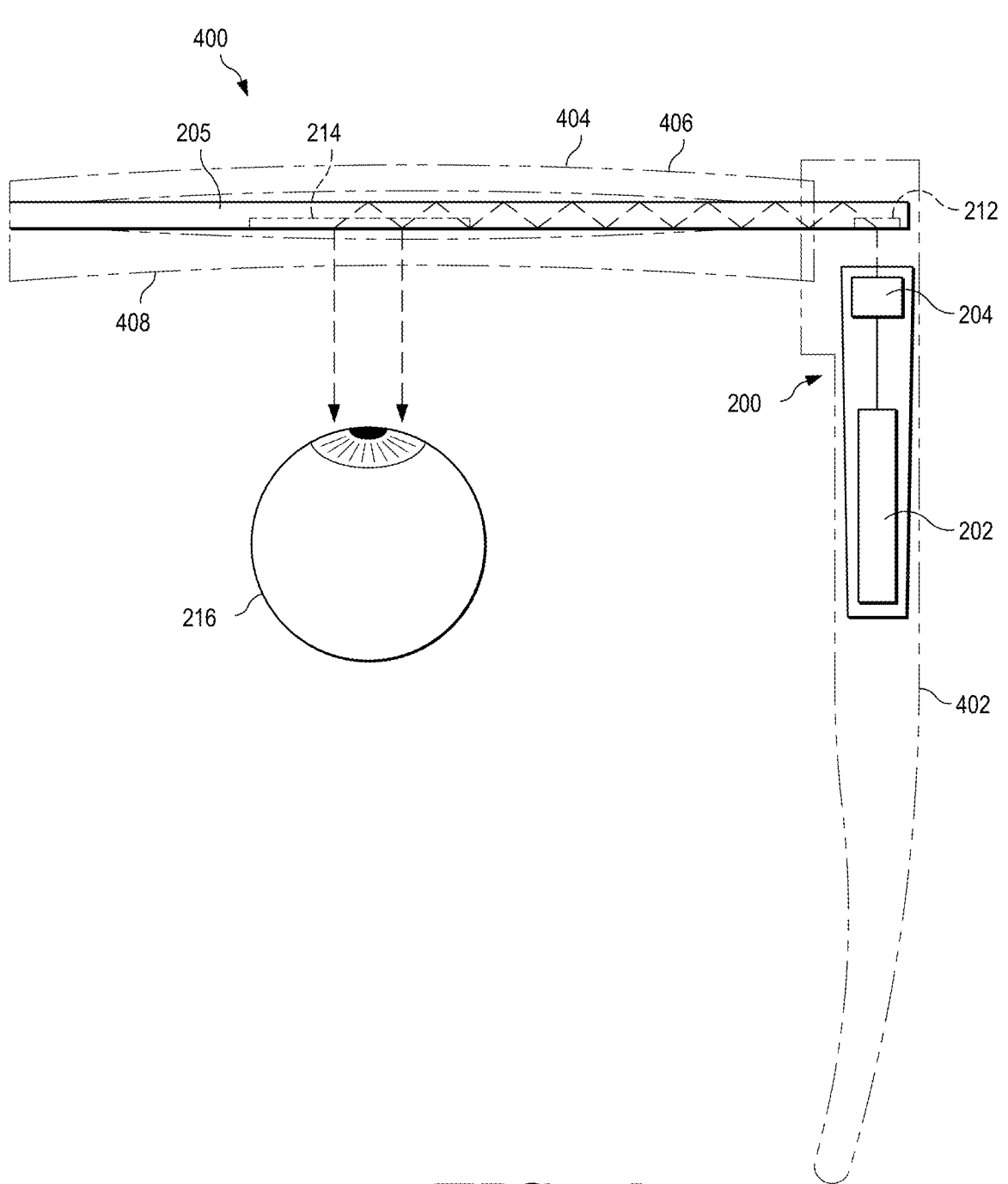
FIG. 4 is a diagram illustrating a partially transparent view of a head-worn display (HWD) that includes a laser projection system, in accordance with some embodiments

FIG. 4 illustrates a portion of an eyewear display 400 that includes the laser projection system 200 of FIG. 2. In some embodiments, the eyewear display 400 represents the display system 100 of FIG. 1. The optical engine 202, the optical scanner 204, the incoupler 212, and a portion of the waveguide 205 are included in an arm 402 of the eyewear display 400, in the present example.

The eyewear display 400 includes an optical combiner lens 404, which includes a first lens 406, a second lens 408, and the waveguide 205, with the waveguide 205 disposed between the first lens 406 and the second lens 408. Light exiting through the outcoupler 214 travels through the second lens 408 (which corresponds to, for example, the lens element 110 of the display system 100). In use, the light exiting second lens 408 enters the pupil of an eye 216 of a user wearing the eyewear display 400, causing the user to perceive a displayed image carried by the laser light output by the optical engine 202. The optical combiner lens 404 is substantially transparent, such that light from real-world scenes corresponding to the environment around the eyewear display 400 passes through the first lens 406, the second lens 408, and the waveguide 205 to the eye 216 of the user. In this way, images or other graphical content output by the laser projection system 200 are combined (e.g., overlayed) with real-world images of the user's environment when projected onto the eye 216 of the user to provide an AR experience to the user.

Although not shown in the depicted example, in some embodiments additional optical elements are included in any of the optical paths between the optical engine 202 and the incoupler 212, in between the incoupler 212 and the outcoupler 214, and/or in between the outcoupler 214 and the eye 216 of the user (e.g., in order to shape the laser light for viewing by the eye 216 of the user). As an example, a prism is used to steer light from the optical scanner 204 into the incoupler 212 so that light is coupled into incoupler 212 at the appropriate angle to encourage propagation of the light in waveguide 205 by TIR. Also, in some embodiments, an exit pupil expander (e.g., the exit pupil expander 304), such as a fold grating, is arranged in an intermediate stage between incoupler 212 and outcoupler 214 to receive light that is coupled into waveguide 205 by the incoupler 212, expand the light, and redirect the light towards the outcoupler 214, where the outcoupler 214 then couples the laser light out of waveguide 205 (e.g., toward the eye 216 of the user).

Further, in some embodiments, waveguide 205 includes surfaces formed from plastic molded parts, plastic formed parts, plastic embossed parts, high refractive index material, or the like that are at least partially reflective. Because the surfaces of waveguide 205 are at least partially reflective, ambient light from outside an HWD (e.g., eyewear display 400) reflects off the waveguide 205 away from the eye 216 of a user, creating a jarring experience for those around the user and negatively impacting user experience. Further, ambient light from outside the HWD reflects off a surface waveguide towards the eye 216 of the user, creating a similarly jarring experience for the user and negatively affecting user experience. Such ambient light includes, for example sunlight, indoor lighting, outdoor lighting, and the like.

Figure 5:
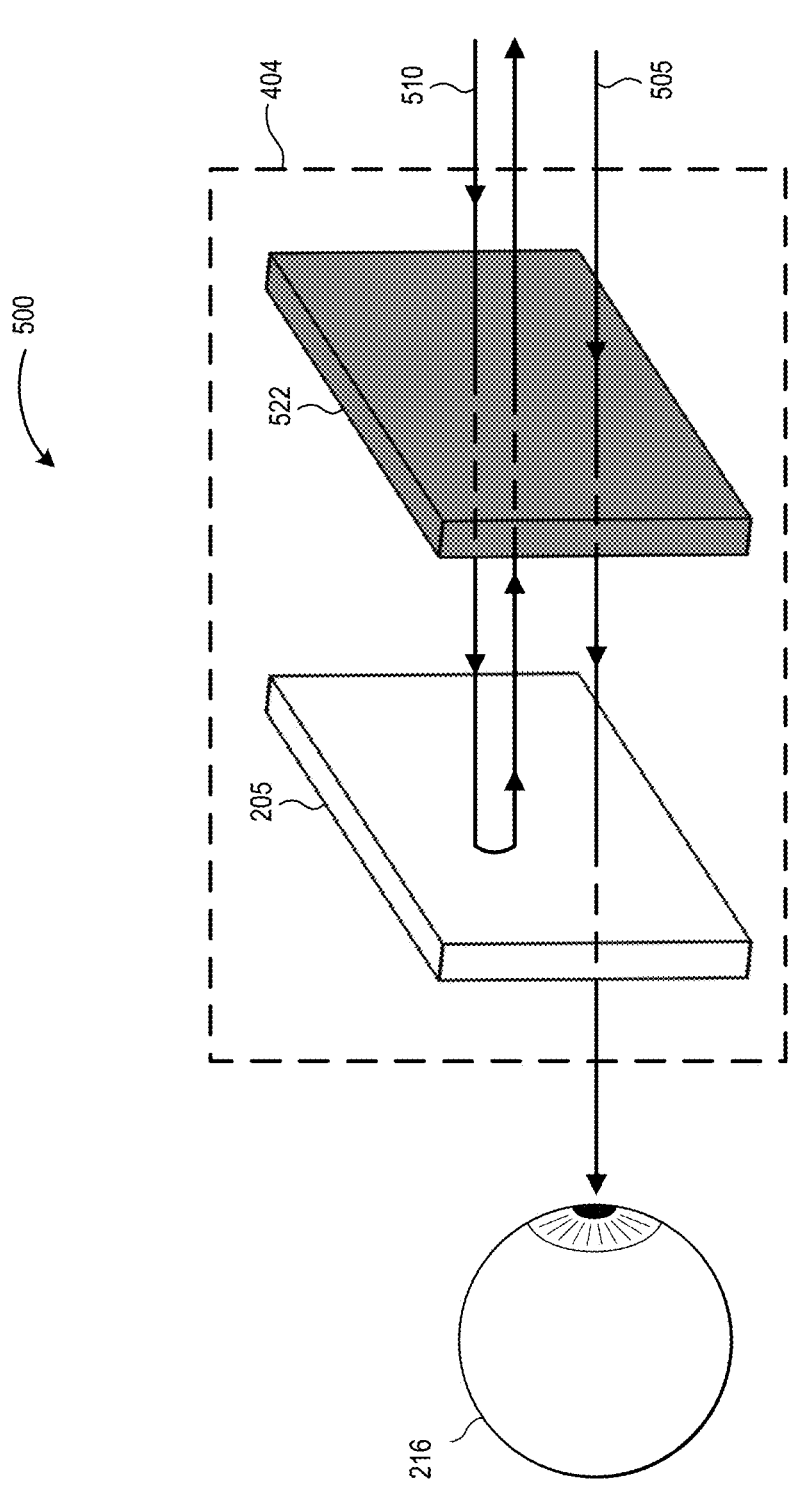
FIG. 5 is a block diagram of a polarization mechanism to reduce reflected light using a tinted film, in accordance with some embodiments.

To this end, in some embodiments, optical combiner 404 is configured to reduce the amount of ambient light reflected away from a user. For example, referring now to FIG. 5, a tinting mechanism 500 to reduce reflected ambient light using a tinted film is presented. In embodiments, tinting mechanism 500 is implemented within optical combiner lens 404 of an HWD (e.g., eyewear display 400) have an eye-facing side (e.g., a side facing the eye 216 of a user) and a world-facing side (e.g., a side facing away from the eye 216 of the user). Tinting mechanism 500 includes optical combiner lens 404 having waveguide 205 disposed at an eye-facing side of optical combiner 404 and a tinted film 522 disposed at the world-facing side of optical combiner 404. That is to say, optical combiner 404 includes waveguide 205 disposed between the eye 216 of a user and a tinted film 522.

Tinted film 522 includes a film (e.g., dyed film, carbon film, ceramic film) having one or more tints (e.g., gray tint, brown tint, amber tint, green tint, yellow tint, blue tint, red tint) and configured to filter at least a portion of ambient light before it reaches waveguide 205, the eye 216 of the user, or both. For example, a first portion of ambient light 505 (e.g., sunlight, indoor lighting, outdoor lighting) is configured to pass through tinted film 522 before passing through waveguide 205 to an eye 216 of a user. As the first portion of ambient light 505 passes through tinted film 522, the first portion of ambient light 505 is attenuated by a first value (e.g., T) based on the tinting of tinted film 522. After being filtered (e.g., attenuated) by tinted film 522, the first portion of ambient light 505 passes through the waveguide 205 and is received at the eye 216 of the user.

Additionally, within tinting mechanism 500, a second portion of ambient light 510 (e.g., sunlight, indoor lighting, outdoor lighting) passes through tinted film 522 and reflects off a surface of waveguide 205 away from the eye 216 of the user. As the second portion of ambient light 510 reflects off waveguide 205, the reflections of the second portion of ambient light 510 again pass through tinted film 522 as they travel away from the eye 216 of a user. Because the reflections of the second portion of ambient light 510 again pass through tinted film 522, the reflections of the second portion of ambient light 510 are attenuated twice by tinted film 522. As such, the reflections of the second portion of ambient light 510 are attenuated to a second value (e.g., $T^2$) based on the tinting of tinted film 522 and the number of times the reflections of the second portion of ambient light 510 pass through tinted film 522. In this way, the reflections of the second portion of ambient light 510 are reduced (e.g., attenuated) as they travel away from the user, helping such reflections to be less noticeable to those around the user of a HWD and improving user experience.

Figure 6:
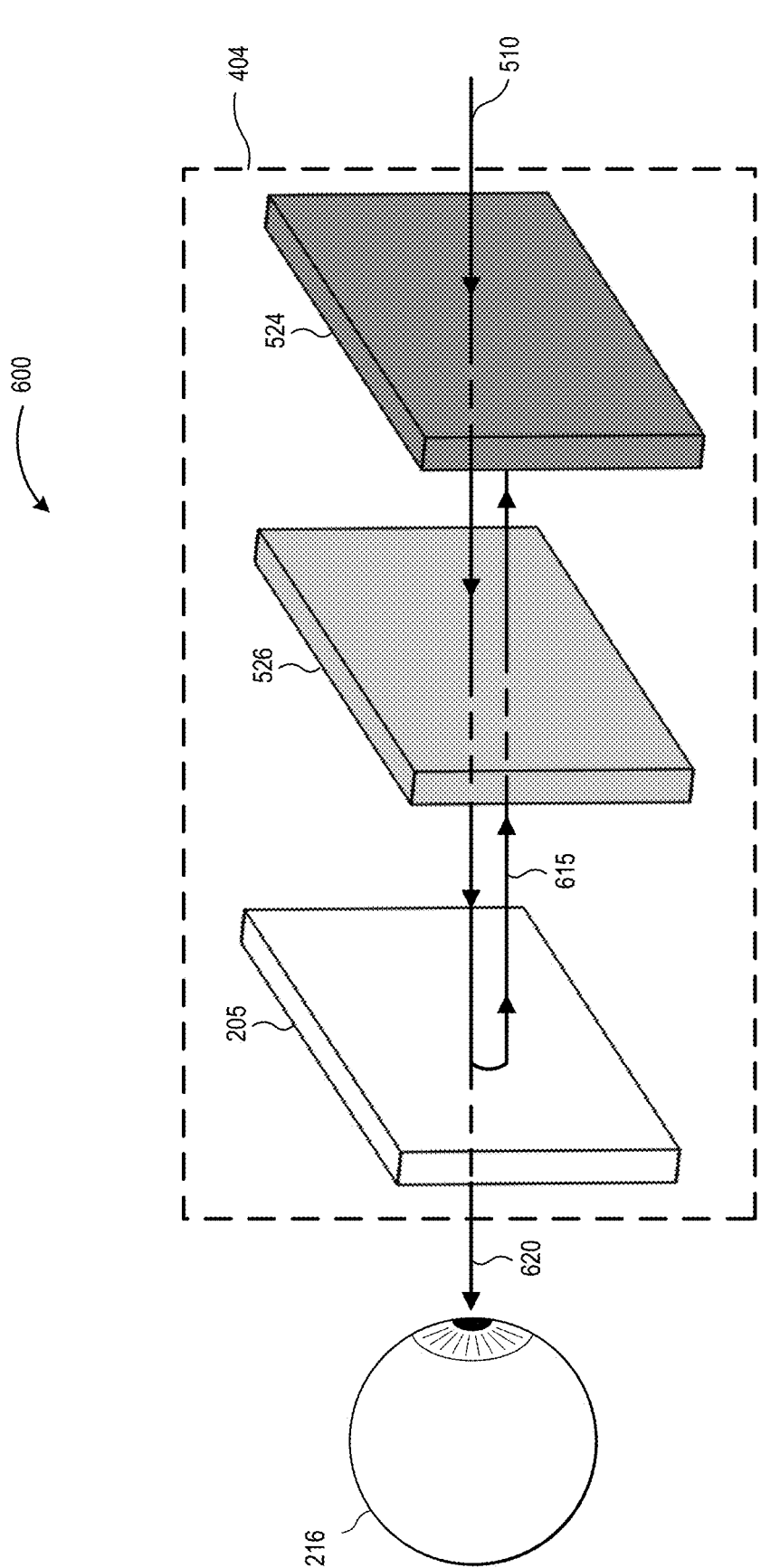
FIG. 6 is a block diagram of a polarization mechanism to reduce reflected light using polarization films, in accordance with some embodiments.

Additionally, to reduce the amount of ambient light reflected away from a user, FIG. 6 presents a polarization mechanism 600 implemented in, for example, optical combiner 404. Polarization mechanism 600 includes optical combiner 404 having a linear polarizer 524 (e.g., linear polarization film), quarter waveplate 526 (e.g., quarter waveplate film), and waveguide 205. For example, optical combiner 404 includes linear polarizer 524 disposed at a world-facing side (e.g., a side facing away from the eye 216 of a user) of optical combiner lens 404, waveguide 205 disposed at an eye-facing side (e.g., a side facing toward the eye 216 of a user) of optical combiner lens 404 film, and quarter waveplate 526 disposed between linear polarizer 524 and waveguide 205. According to embodiments, linear polarizer 524 includes a polarizing film (e.g., a polyvinyl alcohol polarizing film) configured to polarize received light in a linear direction perpendicular to the axis of a beam of light. That is to say, linear polarizer 524 includes a film configured to, for example, horizontally or vertically polarize a received beam of light. According to embodiments, within polarization mechanism 600, linear polarizer 524 is configured to receive ambient light 510 (e.g., sunlight, overhead lighting) at, for example, a world-facing side of optical combiner lens 404. In response to receiving ambient light 510, linear polarizer 524 is configured to polarize ambient light 510 in a first linear direction (e.g., vertical direction, horizontal direction). After being linearly polarized in a first linear direction by linear polarizer 524, linearly polarized ambient light 510 passes to quarter waveplate 526.

Quarter waveplate 526 includes, for example, a film (e.g., quarter waveplate film) configured to polarize received light in a circular direction (e.g., right-hand direction, left-hand direction). In response to receiving linearly polarized ambient light 510 (e.g., ambient light polarized in a first linear direction), quarter waveplate 526 is configured to polarize ambient light 510 in a circular direction and pass the circularly polarized ambient light 510 to waveguide 205. In this way, ambient light 510 is polarized in a circular direction before being received by waveguide 205. In response to receiving the circularly polarized ambient light 510, waveguide 205 transmits a first portion 620 (e.g., transmitted portion) of the circularly polarized ambient light 510 to the eye 216 of a user. As such, the portion (e.g., first portion 620) of ambient light 510 that reaches the eye 216 of a user is polarized in a circular direction, attenuating the transmittance of the portion ambient light 510 that is received by the eye 216 of a user. For example, the portion of ambient light 510 that reaches the eye 216 of a user is attenuated by a first value (e.g., T) based on the degrees of polarization by linear polarizer 524 and quarter waveplate 526, reducing the brightness of the portion of ambient light 510 that reaches the eye 216 and improving user experience.

Further, a reflected portion 615 of ambient light 510 reflects off a surface of waveguide 205 towards quarter waveplate 526. In response to receiving the reflected portion 615 of ambient light 510, quarter waveplate 526 polarizes the reflected portion 615 of ambient light 510 in a circular direction (e.g., right-hand direction, left-hand direction). Because the reflected portion 615 of ambient light 510 was previously polarized in a circular direction when ambient light 510 passed through quarter waveplate 526, the circular polarization of the reflected portion 615 of ambient light 510 by quarter waveplate 526 results in the reflected portion 615 of ambient light 510 being linearly polarized. That is to say, by circularly polarizing the reflected portion 615 of ambient light 510, quarter waveplate 526 polarizes the reflected portion 615 of ambient light 510 in a linear direction. In embodiments, quarter waveplate 526 polarizes the reflected portion 615 of ambient light 510 such that the reflected portion 615 of ambient light 510 is polarized in a second linear direction perpendicular to the first linear direction of linear polarizer 524 (e.g., the first linear direction in which linear polarizer 524 is configured to polarize light). In other words, the reflected portion 615 of ambient light 510 is polarized in a second linear direction perpendicular to the first linear direction in which ambient light 510 was polarized when ambient light 510 first passed through linear polarizer 524.

After being circularly polarized by quarter waveplate 526, the reflected portion 615 of ambient light 510 is received by linear polarizer 524. In response to receiving the reflected portion 615 of ambient light 510, linear polarizer 524 is configured to polarize the reflected portion 615 of ambient light 510 in the first linear direction resulting in the reflected portion 615 being absorbed by linear polarizer 524. That is to say, linear polarizer 524 is configured to absorb the reflected portion 615 of ambient light 510 such that the reflected portion 615 of ambient light 510 does not pass through linear polarizer 524. For example, in response to quarter waveplate 526 circularly polarizing the reflected portion 615 of ambient light 510 such that the reflected portion 615 of ambient light 510 is linearly polarized in a direction perpendicular to the direction of the linear polarization of linear polarizer 524, linear polarizer 524 is configured to absorb the reflected portion 615 of ambient light 510. In this way, reflections of ambient light off the surfaces of waveguide 205 away from the eye 216 of a user are filtered by polarization mechanism 600, helping reduce reflections and helping prevent such reflections from distracting those around the user of an HWD, improving the user experience.

Figure 7:
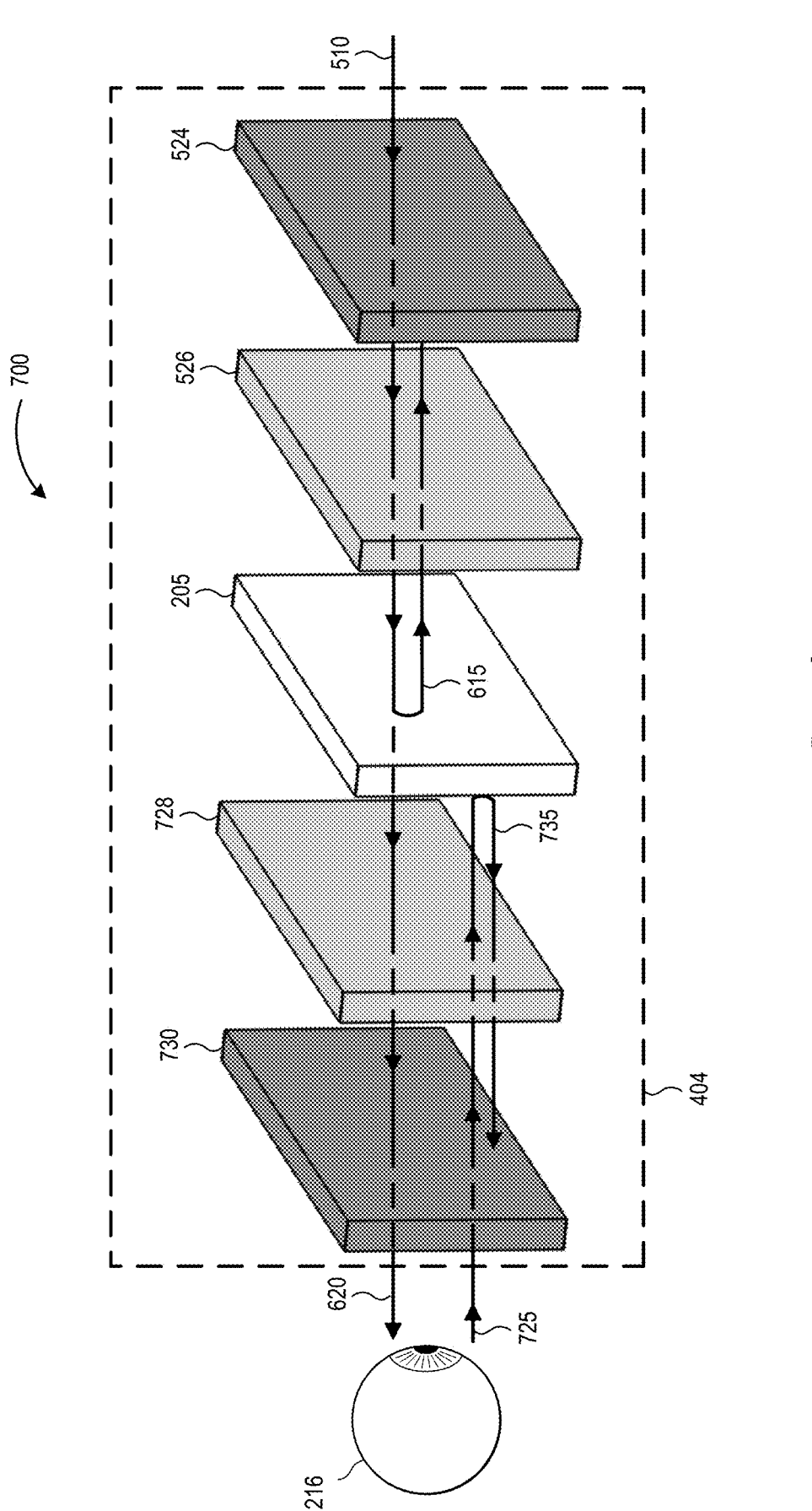
FIGS. 7 and 8 present a block diagrams illustrating aspects of a symmetrical polarization mechanism to reduce reflected light using polarization films, in accordance with some embodiments.

Further, to help reduce reflections of ambient light off the surfaces of a waveguide toward the eye of a user, away from the eye of a user, or both, FIG. 7 presents a symmetrical polarization mechanism 700 configured to reduce reflections from ambient light. In embodiments, symmetrical polarization mechanism 700 is implemented in optical combiner 404. To this end, optical combiner 404 includes a first linear polarizer 524, a first quarter waveplate 526, and a waveguide 205 arranged similarly as in polarization mechanism 600 described above with reference to FIG. 6. Within symmetrical polarization mechanism 700, linear polarizer 524 and quarter waveplate 526 are together configured to polarize ambient light 510 before the ambient light 510 is received at waveguide 205 as within polarization mechanism 600. For example, linear polarizer 524 and quarter waveplate 526 are together configured to circularly polarize ambient light 510 before the ambient light 510 is received at waveguide 205. Additionally, linear polarizer 524 and quarter waveplate 526 are together configured to polarize ambient light reflected off a surface of waveguide 205 away from the eye 216 of the user as within polarization mechanism 600. For example, linear polarizer 524 and quarter waveplate 526 are together configured to polarize ambient light reflected off a surface of waveguide 205 away from the eye 216 of the user such that the reflected portion 615 of ambient light 510 is absorbed by linear polarizer 524 (e.g., the reflected portion 615 of ambient light 510 does not pass through linear polarizer 524) similarly as described above with reference to FIG. 6.

To help reduce reflections of ambient light 510 off a surface of waveguide 205 toward the eye 216 of a user, optical combiner 404 further includes a second quarter waveplate 728 (e.g., quarter waveplate film) configured to polarize received light in a circular direction (e.g., right-hand direction, left-hand direction) and a second linear polarizer 730 that includes, for example, a polarizing film (e.g., a polyvinyl alcohol polarizing film) configured to polarize received light in a linear direction (e.g., first linear direction, second linear direction) perpendicular to the axis of a beam of light. Within optical combiner 404, the second linear polarizer 730 is disposed at the eye-face side (e.g., the side facing the eye 216 of the user) of optical combiner 404 and the second quarter waveplate 728 is disposed between the second linear polarizer and the waveguide 205. According to embodiments, a first portion 620 (e.g., transmitted portion) of ambient light 510 passes through waveguide 205 and is received by the second quarter waveplate 728. In response to receiving the first portion 620 of ambient light 510, the second quarter waveplate 728 is configured to circularly polarize the first portion 620 of ambient light 510. In some embodiments, second quarter waveplate 728 is configured to circularly polarize in a same direction (e.g., right-hand direction, left-hand direction) as the first quarter waveplate 526 while in other embodiments second quarter waveplate 728 is configured to circularly polarize in a different direction from the first quarter waveplate 526. Because the first portion 620 of ambient light 510 was previously polarized in a circular direction when the first portion 620 passed through the first quarter waveplate 526, the second quarter waveplate 728 circularly polarized the first portion 620 such that the first portion 620 is linearly polarized (e.g., linearly polarized in a first or second linear direction). That is to say, because the first portion 620 of ambient light 510 is circularly polarized when it arrives at second quarter waveplate 728, second quarter waveplate 728 polarizes the first portion 620 in a linear direction.

After second quarter waveplate 728 polarizes the first portion 620 in a linear direction, second quarter waveplate 728 provides the first portion 620 to second linear polarizer 730. According to some embodiments, second linear polarizer 730 is configured to polarize light in a same linear direction as the first linear polarizer 524 while in other embodiments, second linear polarizer 730 is configured to polarize light in a different linear direction from first linear polarizer 524. In response to receiving the first portion 620 from second quarter waveplate 728, second linear polarizer 730 is configured to pass the first portion 620 to the eye 216 of the user. As an example, in some embodiments, second waveplate 728 is configured to circularly polarize the first portion 620 of ambient light 510 such that the first portion 620 is polarized in the same linear direction as the direction of second linear polarizer 730 (e.g., the same linear direction in which second linear polarizer 730 is configured to polarize light). In this way, symmetrical polarization mechanism 700 helps reduce any loss of the first (e.g., transmitted) portion 620 of ambient light 510 before the first portion 620 is received at the eye 216 of a user.

Additionally, in embodiments, second linear polarizer 730 is configured to receive ambient light 725 (e.g., sunlight, indoor lighting, outdoor lighting) originating, for example, from the eye-facing side of optical combiner lens 404. In response to receiving ambient light 725, second linear polarizer 730 is configured to polarize ambient light 725 in a first linear direction (e.g., horizontal direction, vertical direction) and provide the linearly polarized ambient light 725 to second quarter waveplate 728. After receiving the linearly polarized ambient light 725, second quarter waveplate 728 circularly polarizes the linearly polarized ambient light such that ambient light 725 is polarized in a circular direction (e.g., right-hand direction, left-hand direction) and passes the circularly polarized ambient light 725 to waveguide 205. According to embodiments, a portion of the circularly polarized ambient light 725 reflects off a surface of waveguide 205 back at the eye 216 of the user as reflected portion 735. After reflecting off a surface of waveguide 205, reflected portion 735 is received by second quarter waveplate 728. Because ambient light 725 was circularly polarized before reflecting off a surface of waveguide 205, reflected portion 735 is circularly polarized when it is received by second quarter waveplate 728. As such, second quarter waveplate 728 is configured to circularly polarize reflected portion 735 such that reflected portion 735 is linearly polarized in a second linear direction perpendicular to the first linear direction (e.g., the linear direction in which second linear polarizer 730 polarized ambient light 725). After polarizing reflected portion 735 in a second linear direction, second quarter waveplate 728 provides the reflected portion 735 to second linear polarizer 730. In response to receiving the reflected portion 735, second linear polarizer 730 is configured to absorb the reflected portion 735 such that the reflected portion 735 does not pass through second linear polarizer 730. For example, because second quarter waveplate 728 polarizes reflected portion 735 in a second linear direction perpendicular to the first linear direction in which second linear polarizer 730 polarizes light, second linear polarizer 730 absorbs the reflected portion 735. By polarizing ambient light 725 in this way, reflections of ambient light 725 off the surfaces of waveguide 205 toward the eye 216 of a user are absorbed by the second linear polarizer 730 before they reach the eye 216 of the user, improving the user experience.

Figure 8:
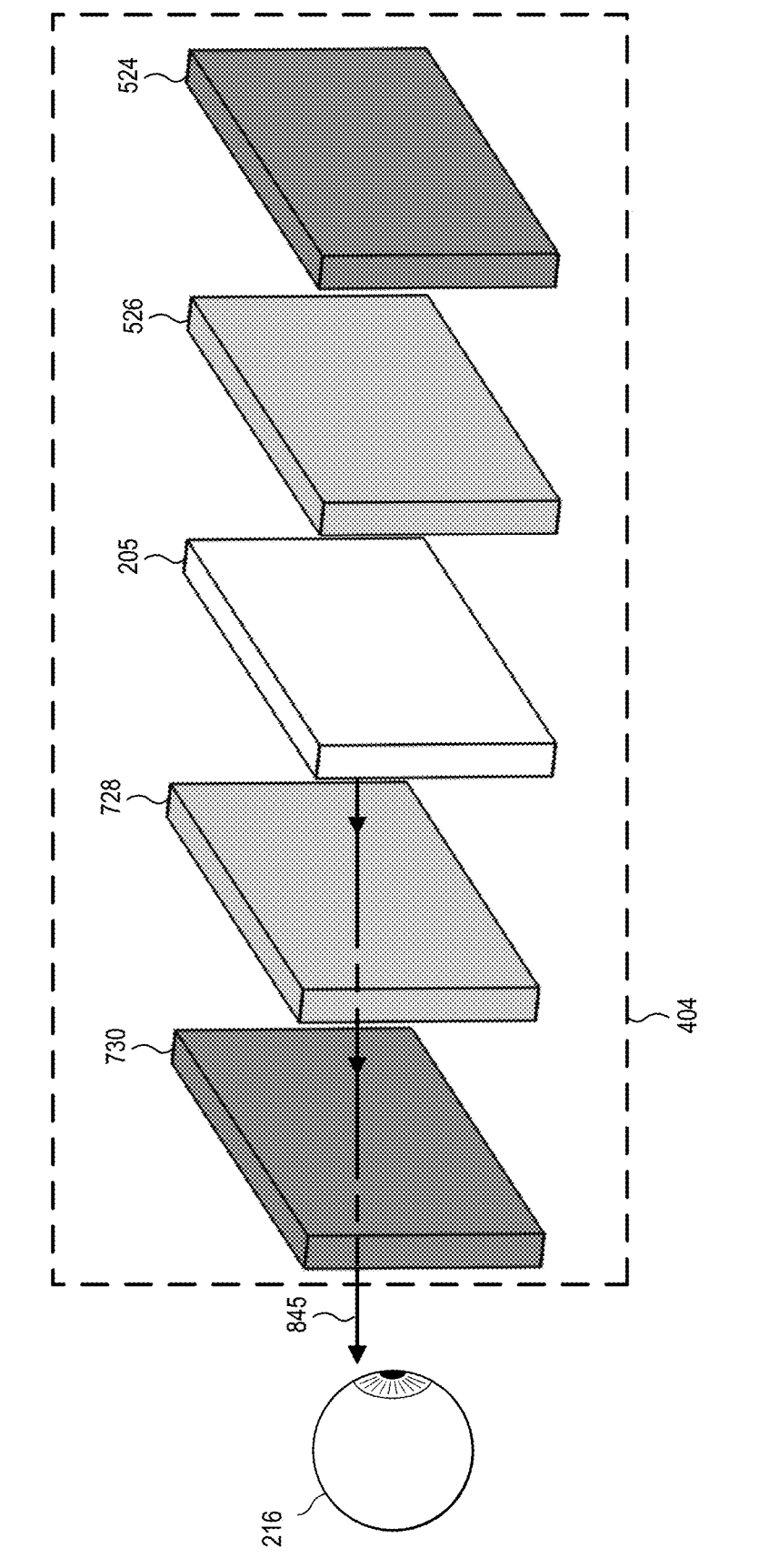

Referring now to FIG. 8, in embodiments, within symmetrical polarization mechanism 700, waveguide 205 is configured to direct light from an optical engine (e.g., optical engine 202) toward the eye 216 of a user to display an image. For example, waveguide 205 includes outcoupler 214 configured to direct light 845 representing an image to the eye 216 of a user. Further, light 845 provided from waveguide 205 passes through second quarter waveplate 728 and second linear polarizer 730 before light 845 is received by the eye 216 of a user. As such, in some embodiments, at least a portion of light 845 is filtered (e.g., attenuated) by second quarter waveplate 728, second linear polarizer 730, or both before it is received at the eye 216 of a user. Such filtering of light 845, for example, may, in some embodiments, dim the brightness of light 845 and diminish the quality of the image represented by light 845.

Figure 9:
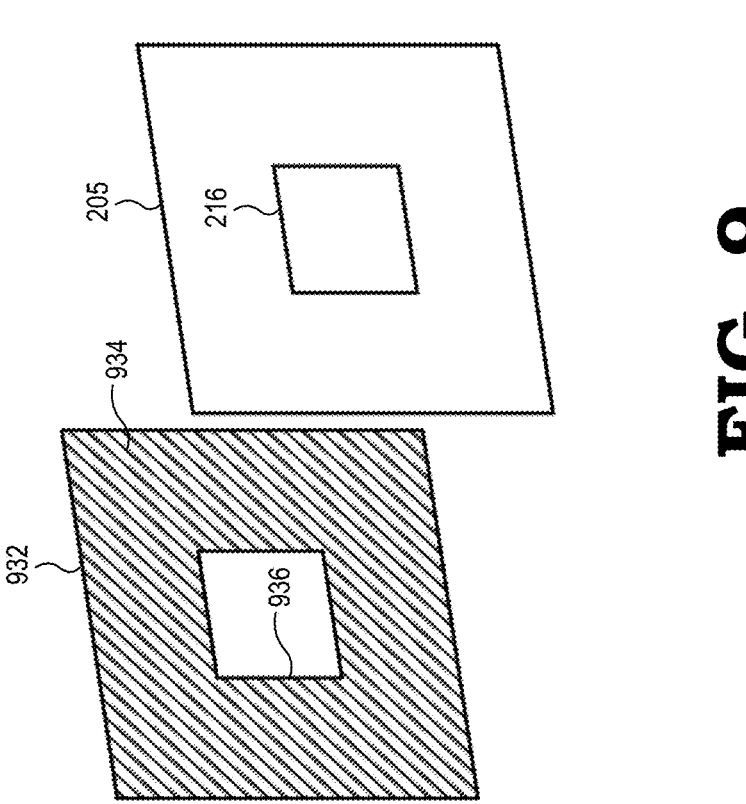
FIG. 9 is an isometric view of a spatially selective polarization mechanism, in accordance with some embodi-ments.

To this end, FIG. 9 presents a spatially selective polarization mechanism 900. Spatially selective polarization mechanism 900, for example, is configured to reduce the attenuation of light 845 provided from waveguide 205 before light 845 is received at the eye 216 of a user. In embodiments, spatially selective polarization mechanism 900 is implemented in optical combiner 404 and includes one or more spatially selective polarization films 932. Such spatially selective polarization films 932, for example, include a polarization material (e.g., polyvinyl alcohol polarizing film) configured to polarize light in linear (e.g., vertical direction, horizontal direction) or circular direction (e.g., right-hand direction, left-hand direction). Further, in some embodiments, one or more spatially selective polarization films 932 are configured to be implemented in first linear polarizer 524, first quarter waveplate 526, second linear polarizer 730, second quarter waveplate 728, or any combination thereof of symmetric polarization mechanism 700.

According to embodiments, a spatially selective polarization film 932 is configured to allow output light 845 provided from an outcoupler 214 of waveguide 205 to pass through the spatially selective polarization film 932 unfiltered (e.g., unattenuated). To this end, a spatially selective polarization film 932 includes a first portion 934 configured to polarize light in a linear direction or circular direction. As an example, the first portion 934 of a spatially selective polarization film 932 includes a linear polarization film configured to polarize light in a linear direction or a quarter waveplate film configured to polarize light in a circular direction. Additionally, a spatially selective polarization film 932 includes an aperture 936 configured to allow light through unfiltered (e.g., unattenuated). For example, aperture 936 includes no polarization material (e.g., no polarization film) such that light travels through aperture 936 unattenuated. In embodiments, aperture 936 of a spatially selective polarization 936 has a shape and size similar to or the same as an outcoupler 214 of waveguide 205. For example, aperture 936 has a same shape and similar size to outcoupler 214 of waveguide 205 such that light 845 provided from outcoupler 214 is unattenuated as it passes through spatially selective polarization film 932 via aperture 936. Additionally, in embodiments, aperture 936 of a spatially selective polarization film 932 is disposed at a position on the spatially selective polarization film 932 such that aperture 936 is effectively aligned with outcoupler 214 so as to allow light 845 to pass unattenuated through the spatially selective polarization film 932 via aperture 936. Further, according to embodiments, the apertures 936 of one or more spatially selective polarization films 932 are aligned such that light 845 travels through each spatially selective polarization film 932 unfiltered (e.g., unattenuated) via each respective aperture 936. In this way, light (e.g., output light 845) provided by outcoupler 214 of waveguide 205 is received at the eye 216 of a user unfiltered (e.g., unattenuated), increasing the brightness of the light provided by waveguide 205 and improving the quality of the image represented by the light when it is received by the eye 216 of a user.

In some embodiments, certain aspects of the techniques described above may be implemented by one or more processors of a processing system executing software. The software comprises one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM), or other non-volatile memory device or devices, and the like. The executable instructions stored on the non-transitory computer-readable storage medium may be in source code, assembly language code, object code, or other instruction format that is interpreted or otherwise executable by one or more processors.

A computer-readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still, further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method for polarizing light in a wearable display, comprising:

linearly polarizing ambient light received at a first side of a wearable display in a first linear direction;

circularly polarizing the ambient light polarized in the first linear direction in a first circular direction;

circularly polarizing a reflection of the ambient light polarized in the first circular direction reflected off a waveguide of the wearable display such that the reflection of the light is polarized in a second linear direction perpendicular to the first linear direction; and linearly polarizing ambient light received at a second side of the wearable display in a third linear direction, wherein the second side is different from the first side.

2. The method of claim 1, further comprising:

absorbing the reflection of the light polarized in the second linear direction at a linear polarizer.

3. The method of claim 1, further comprising:

circularly polarizing the ambient light polarized in the third linear direction in a second circular direction; and circularly polarizing a reflection of the ambient light polarized in the second circular direction reflected off the waveguide of the wearable display such that the reflection of the ambient light is polarized in a fourth linear direction perpendicular to the first linear direction.

4. The method of claim 3, wherein the third linear direction is the same as the first linear direction.

5. The method of claim 3, further comprising:

absorbing the reflection of the ambient light polarized in the fourth linear direction at a second linear polarizer.

6. A polarization mechanism for a wearable display, comprising:

a waveguide;

a quarter waveplate configured to receive a reflection of ambient light off the waveguide and polarize the reflection of ambient light in a circular direction such that the reflection of ambient light is polarized in a first linear direction; and a linear polarizer configured to receive the reflection of ambient light polarized in the first linear direction and absorb the reflection of ambient light polarized in the first linear direction, the linear polarizer including an aperture configured to allow display light to pass unattenuated.

7. The polarization mechanism of claim 6, wherein the linear polarizer is configured to polarize light in a second linear direction perpendicular to the first linear direction.

8. The polarization mechanism of claim 6, wherein the reflection of ambient light is reflected off a first side of the waveguide.

9. The polarization mechanism of claim 8, further comprising:

a second quarter waveplate configured to receive a second reflection of ambient light off a second side of the waveguide and polarize the second reflection of ambient light in a second circular direction such that the second reflection of ambient light is polarized in a second linear direction, wherein the second side of the waveguide is different from the first side of the waveguide; and a second linear polarizer configured to receive the second reflection of ambient light polarized in the second linear direction and absorb the second reflection of ambient light polarized in the second linear direction.

10. The polarization mechanism of claim 9, wherein the second linear polarizer is configured to polarize light in a third linear direction perpendicular to the second linear direction.

11. The polarization mechanism of claim 6, further comprising an optical combiner lens including the quarter waveplate and the linear polarizer.

12. The polarization mechanism of claim 6, wherein the aperture is configured to allow the display light as output from the waveguide to pass through the linear polarizer unattenuated.

13. An optical combiner, comprising:

a waveguide;

a linear polarizer configured to linearly polarize ambient light received at a first side of the optical combiner in a first linear direction;

a quarter waveplate configured to:

circularly polarize the ambient light polarized in the first linear direction in a first circular direction; and circularly polarize a reflection of the ambient light polarized in the first circular direction reflected off the waveguide such that the reflection of the ambient light is polarized in a second linear direction perpendicular to the first linear direction; and a second linear polarizer configured to linearly polarize ambient light received at a second side of the optical combiner in a third linear direction, wherein the second side is different from the first side.

14. The optical combiner of claim 13, wherein the linear polarizer is configured to:

absorb the reflection of the ambient light polarized in the second linear direction.

15. The optical combiner of claim 13, further comprising:

a second quarter waveplate configured to:

circularly polarize the ambient light polarized in the third linear direction in a second circular direction; and circularly polarize a reflection of the ambient light polarized in the second circular direction reflected off the waveguide such that the reflection of the ambient light is polarized in a fourth linear direction perpendicular to the first linear direction.

16. The method of claim 1, further comprising:

allowing, by an aperture in a linear polarizer, display light to pass unattenuated.

17. The method of claim 16, wherein the aperture is configured to allow the display light as output from the waveguide to pass through the linear polarizer unattenuated.

18. The optical combiner of claim 13, wherein the linear polarizer includes an aperture configured to allow display light to pass unattenuated.

19. The optical combiner of claim 18, wherein the aperture is configured to allow the display light as output from the waveguide to pass through the linear polarizer unattenuated.

20. The optical combiner of claim 13, wherein the waveguide is implemented as part of an eyeglass lens.

\* \* \* \* \*